United States Patent [19]

Heise et al.

[11] E Re. 29,584

[45] Reissued Mar. 21, 1978

[54] USE OF $CO_2$ IN ARGON-OXYGEN REFINING OF MOLTEN METAL

[75] Inventors: Barrett Henry Heise, Williamsville; Roger Nels Dokken, Katonah, both of N.Y.

[73] Assignee: Union Carbide Corporation, New York, N.Y.

[21] Appl. No.: 760,841

[22] Filed: Jan. 21, 1977

Related U.S. Patent Documents

Reissue of:

[64] Patent No.: 3,861,888
Issued: Jan. 21, 1975
Appl. No.: 374,635
Filed: Jun. 28, 1973

[51] Int. Cl.[2] ..... C21C 5/30
[52] U.S. Cl. ..... 75/60; 75/59
[58] Field of Search ..... 75/60, 59

[56] References Cited

U.S. PATENT DOCUMENTS

| | | | |
|---|---|---|---|
| 2,855,293 | 10/1958 | Savard | 75/60 |
| 3,046,107 | 7/1962 | Nelson | 75/59 |
| 3,252,790 | 5/1966 | Krivsky | 75/60 |
| 3,397,878 | 8/1968 | Holmes | 266/41 |
| 3,649,246 | 3/1972 | Fulton | 75/60 |
| 3,706,549 | 12/1972 | Knuppel | 75/60 |
| 3,728,101 | 4/1973 | d'Entremont | 75/11 |

*Primary Examiner*—Peter D. Rosenberg
*Attorney, Agent, or Firm*—Warrick E. Lee, Jr.

[57] ABSTRACT

An improved argon-oxygen decarburization process for refining stainless steel comprising injecting a three component gas mixture consisting of oxygen, argon and carbon dioxide into the molten steel during decarburization. [The critical upper limit of $CO_2$ injection into the melt is defined, below which the carbon removal efficiency is improved.] The preferred flow rate of $CO_2$ during each of the three principal phases of decarburization is set forth as a function of the flow rate of oxygen and argon, bath temperature and carbon content of the melt.

4 Claims, No Drawings

USE OF $CO_2$ IN ARGON-OXYGEN REFINING OF MOLTEN METAL

Matter enclosed in heavy brackets [ ] appears in the original patent but forms no part of this reissue specification; matter printed in italics indicates the additions made by reissue.

This invention relates, in general, to a method for decarburizing metals and alloys, and more specifically, to an improvement in the argon-oxygen decarburization of stainless steels.

Prior to the invention of the argon-oxygen decarburization (hereinafter referred to as "AOD") process, the customary practice in the manufacture of stainless steels had been to melt an alloy containing a much lower chromium percentage than specified in the finished steel, decarburize, and then increase the chromium content to the desired level by the addition of chromium, generally, in the form of low-carbon ferrochrome. This procedure had been followed because molten stainless steels containing the specified chromium content were unable to be decarburized without severe oxidation of chromium.

The AOD process is a duplex process, particularly useful for refining stainless steels without substantial loss of chromium. The basic AOD process is disclosed in Krivsky, U.S. Pat. No. 3,252,790 and an improvement thereon relating to programmed blowing is disclosed in Nelson et al., U.S. Pat. No. 3,046,107. The process comprises melting the alloy (substantially at the desired composition with respect to metallics) in an arc furnace, and transferring the molten metal, after it has been deslagged, to a refining vessel wherein it is decarburized by subsurface blowing with an inert gas-oxygen mixture (in commercial practice most frequently an argon-oxygen mixture), the argon being present in order to reduce the partial pressure of carbon monoxide in the gas in contact with the melt. The molten metal is thereafter reduced, finished and tapped into a teeming ladle. A suitable refining vessel, is disclosed by Saccomano and Ellis in U.S. Pat. No. 3,724,830.

Although the introduction of an inert gas-oxygen mixture into a molten stainless steel favors decarburization relative to the oxidation of metallic elements in the melt, it does not, however, suppress metallic oxidation entirely. That is, the continued presence of metal oxides in the slag reflects the fact that a substantial proportion of oxygen reacts with materials in the melt other than carbon. Indeed, during a typical AOD run, the carbon removal efficiency, namely, the percentage of total oxygen introduced into the melt which combines with carbon, may vary from 75% to less than 10%, depending on operating conditions. Moreover, the resulting metallic loss is recoverable only at the expense of adding reducing agents, such as, silicon or aluminum metals to the slag after decarburization of the melt is completed.

[Another] *An* area of improvement is existing AOD practice relates to shortening the overall process time. The chemical reactions of steel refining are, for the most part, oxidation reactions which generate heat; the metal bath temperature being established at the point where the heat generated in the bath equals the heat lost by the refining vessel through radiation and convection. Thus, the faster heat is generated, the higher the bath temperature at the point of thermal equilibrium. Accordingly, the speed of decarburization can be increased by increasing the process gas flow rates, but only at the expense of higher bath temperature and increased refractory wear of the furnace lining. Consequently, there is a need for increasing the speed of decarburization in an AOD process without exceeding a predetermined temperature limit beyond which the effective life of the furnace refractory is considerably shortened, generally about 3,100° F.

Periodic addition of scrap as a coolant is a commonly accepted procedure for maintaining the bath temperature within the desired operating range. However, the logistics of supplying scrap at the furnace at the exact time it is needed and the difficulty of keeping stainless scrap segregated by type often precludes its use. Furthermore, scrap cools the metal bath discontinuously, such that the addition of scrap with its attendant sudden drop in bath temperature frequently causes excessive metallic oxidation for the period of time during which the bath is cooled below an efficient decarburization temperature.

It is therefore apparent that an AOD refining process which would shorten the time required for decarburization by increasing the process gas flow rates [as well as the carbon removal efficiency] while continuously controlling the bath temperature within prescribed limits is a desirable improvement on conventional AOD practice.

OBJECTS

Accordingly, it is an object of the invention [to improve the carbon removal efficiency in argon-oxygen decarburization of stainless steel. It is a further object of this invention] to increase the speed of argon-oxygen decarburization by permitting higher process gas flow rates without increasing refractory wear.

It is still another object of this invention to provide a process for continuously cooling a stainless steel bath during argon-oxygen refining such that the metal bath temperature is readily maintained within the desired operating range.

SUMMARY

The above objects and others which will readily be apparent to those skilled in the art are achieved by the present invention one embodiment of which comprises: in a process for decarburizing a mass of chromium-containing molten steel characterized by the subsurface injection of oxygen and at least one inert gas selected from the group consisting of helium, neon, krypton, argon, xenon and nitrogen, into said mass of said molten steel, wherein at least a portion of said oxygen reacts with the carbon in said molten steel to form a volatile carbon oxide, comprising a first phase of decarburization wherein the temperature of said molten steel is increased to the desired operating range; a second phase of decarburization wherein the carbon content of the molten steel is reduced to a predetermined value corresponding approximately to the carbon content of the melt in equilibrium with CO at a partial pressure of 1 atmosphere and at a temperature within said desired operating range; and a third phase of decarburization wherein the carbon content of the melt is reduced from said predetermined value to approximately the desired carbon content of the molten steel, the improvement comprising:

Injecting a gas consisting essentially of $CO_2$ into said mass of molten steel during said third phase of decarburization in an amount less than that defined by the formula:

$$F_{CO_2} = [F_I P/(1-P) - 2XF_{O_2}]$$

where:

$F_{CO_2}$ = flow rate of $CO_2$, (cfm)

$F_I$ = flow rate of said inert gas, (cfm)

$F_{O_2}$ = flow rate of $O_2$, (cfm)

(All volumes are measured at 70° F and one atmosphere pressure).

P = equilibrium partial pressure of CO for the particular bath temperature and carbon content of the molten steel, (atmospheres), and X = carbon removal efficiency in the absence of $CO_2$.

The term "decarburization" as used herein refers to the lowering of the carbon content of the molten steel from any given level to any desired lower level by the injection of oxygen into the melt. The term "mass" is intended to mean a batch or heat of molten metal, as well as a changing mass as in a continuous process.

The term "chromium-containing molten steel" as used herein is intended to comprise ferrous alloys containing about 3–40% chromium.

[The invention is predicated on the discovery that the injection of $CO_2$ along with oxygen and an inert gas into the molten steel increases the carbon removal efficiency during decarburization. In ordinary AOD practice, as the carbon level of the steel decreases, the caron removal efficiency is known to decrease as well. Unexpectedly, by substituting $CO_2$ for some of the oxygen and/or argon, the carbon removal efficiency is increased and consequently, the absolute rate of carbon removal (i.e. the speed of decarburization) is also increased. Furthermore, the primary function of the inert gas in the inert gas-oxygen mixture is to lower the partial pressure of carbon monoxide in contact with the melt and thereby enhance carbon removal. Therefore, inasmuch as carbon monoxide is one of the decomposition products of $CO_2$ in the melt, the increase in the carbon removal efficiency resulting from the present invention is truly surprising.]

The flow rate of $CO_2$ in accordance with the relationship set forth above, is defined in terms of an upper limit in order to prevent an excess of $CO_2$ from being injected into the melt and recarburizing the bath. It is calculated as follows: the maximum flow rate of carbon monoxide out of the vessel is related to the flow rate of argon by the following relationship:

$$[P = F_{CO}^{max}/F_{CO}^{max} + F_I]$$

$$P = F_{CO}^{max}/(F_{CO}^{max} + F_I)$$

where the system pressure is 1 atmosphere.

Stated otherwise:

$$F_{CO}^{max} = F_I P/(1-P)$$

The value of P can be calculated from literature data (Electric Furnace Steelmaking, Vol. II, Chapter 16, p. 95; Chipman, J., J.I.S.I., pp. 97–106, June, 1955; Schenck, H., et al., Stahleisen Sonderberichte, Special Report No. 7, Stahleisen mbh, Dusseldorf, 1966). The actual flow of carbon monoxide is $F_{CO} = 2XF_{O_2}$ The difference between $F_{CO}^{max}$ and $F_{CO}$ must accommodate the additional carbon monoxide from the [improved decarburization as well as that from] dissociation of carbon dioxide. The flow rate of carbon dioxide must therefore be less than the following amount [in order to benefit the carbon removal efficiency.]

$$F_{CO_2} = [F_I P/(1-P) - 2XF_{O_2}]$$

For most effective operation, the flow rates of the three components gas mixture and the blow time required to achieve the desired decarburization are defined as follows:

$$t = \frac{322\,\frac{C_i - C_f}{X}\,[0.04X + 1.29\,(1 - X) + 1.24] - T_f + T_i}{\frac{1.24\,(F_T - F_I) + Z_I F_I}{W} + K_r} \quad (1)$$

$$F_{co_2} = 2(F_T - F_I) - \frac{644(C_i - C_f)}{x}\,\frac{W}{t} \quad (2)$$

$$(3)\ FO_2 = FT - F_{Ar} - F_{CO_2}$$

where:

$F_{CO_2}$ = flow rate of $CO_2$, (cfm)

$FO_2$ = flow rate of $O_2$, (cfm)

$F_I$ = flow rate of inert gas, (cfm)

$F_T$ = total gas flow rate for the particular system, (cfm)

t = blowing time, (minutes)

$C_i$ = carbon content of the melt at the start of the blow, (percent)

$C_f$ = carbon content of the melt at the end of the blow, (percent)

$T_i$ = metal bath temperature at the start of the blow, (° F)

$T_f$ = metal bath temperature at the end of the blow, (° F)

W = total weight of molten metal, (tons)

$K_r$ = measured heat loss coefficient of the vessel, (° F/min).

X = carbon removal efficiency in the absence of $CO_2$, and $Z_I$ = enthalpy of the inert gas at the operating temperature of the bath (For argon $Z_I = 0.06$).

According to another embodiment of the invention, a three component gas mixture containing oxygen, $CO_2$ and an inert gas (preferably argon) may optionally be injected during said first and/or second phases of decarburization. Thus, the three component gas mixture may be effectively used during all three phases of decarburization, during the second or third phases of decarburization or only during said third phase. When used during the second phase of decarburization the preferred flow rates for each of the gases in the three phase mixture and the corresponding blow time are defined by the identical relationship previously set forth for phase 3 of decarburization. That is, equations (1), (2) and (3) define the preferred gas flow and blow time for both the second and third phases of decarburization.

For the first phase of decarburization during which the bath temperature is increased to the desired operating range, the flow rates of oxygen, argon and $CO_2$ are generally set at a fixed predetermined ratio and consequently the variables to be determined are the carbon content at the end of the blow and the blow time required. It is preferred that $CO_2$ be used during said first phase to the exclusion of argon because it improves process control. Accordingly, mixtures of $O_2$ and $CO_2$ may be effectively used in ratios varying from 4:1 to 1:1. The remaining variables of time, temperature, flow and carbon content are preferably related by the following equations:

$$(4)\ t = W(T_f - T_i)/[0.40X + 1.35(1-X)][F_{O_2} + \tfrac{1}{2} F_{CO_2}] - 0.62\,F_{CO_2} - KrW - Z_f F_t$$

$$(5)\ C_f = C_i - tX/W \cdot 1/322\,(F_{O_2} + \tfrac{1}{2} F_{CO_2})$$

DETAILED DESCRIPTION OF THE INVENTION

Steel refining in accordance with conventional AOD practice can be conveniently characterized by three phases of decarburization corresponding to three distinct blow periods. In the first phase, the molten metal is blown with a gas mixture containing predominantly oxygen so as to raise the bath temperature to the desired operating range (generally about 3,000°-3,100° F) as quickly as possible. Once the desired bath temperature is reached, the second blow period begins during which the ratio of argon to oxygen in the blowing gas mixture is increased to prevent the bath from overheating, and the carbon content of the melt is reduced to approximately the point where further decarburization can only be achieved at the expense of substantial chromium oxidation in the melt. Hence, the termination point of the second phase of decarburization is governed by the chromium-carbon equilibrium at the temperature and pressure of the melt. Further reduction in the carbon content of the melt to approximately the desired level is achieved during the third phase of decarburization by further increasing the argon/oxygen ratio of the gas mixture in order to decrease the partial pressure of carbon monoxide in contact with the melt, thereby favoring the oxidation of carbon relative to chromium.

The manner in which the flow equations defined herein are used in practice of the AOD process may be illustrated by the following example. For a given vessel and heat of steel, W, $K_r$, and $F_T$ will be known. The value of X, the carbon removal efficiency, is calculated from the relationship:

$$X = 322\,(C_i - C_f)/V_{OX}$$

where $V_{OX}$ = volume of oxygen ($ft^3$)/ton of metal

Since X will vary depending upon carbon content of the melt, bath temperature and vessel characteristics, it must be determined empirically under the operating conditions of interest.

For the blow period corresponding to the first phase of decarburization, the following variables are generally fixed: $T_f$(3,050° F, for example), $F_{O_2}$ and $F_{CO_2}$ (in the ratio of 3:1, for example). The time (t) required to heat the bath during this first phase and the carbon content resulting from the blow ($C_f$) are calculated from equations (4) and (5).

During the second phase of decarburization the known conditions differ from those in the first phase. Thus, the following variables are fixed: $C_i$ (the former $C_f$), $C_f$(0.25%, for example), $T_i$, $T_f$(3,050° F, for example) and X (previously calculated). The variables t, $F_{CO_2}$ and $F_{O_2}$ can then be calculated in accordance with equations (1), (2) and (3).

During the third phase of decarburization the furnace operator may wish to decarburize to C = 0.05% while attaining a temperature 3,100° F preparatory to finish the heat. The given conditions are thus changed to accomodate the additional argon which will be required to decarburize the melt to a level below 0.25% carbon. The given conditions are $C_i$ (0.25%), $C_f$ (0.05%), $T_i$ (3,050° F), $T_f$(3,100° F), $F_{Ar}$ ($\tfrac{1}{2} F_T$, for example) and X. Solution of equations (1), (2) and (3) yields values for the variables t, $F_{CO_2}$ and $F_{O_2}$. The numeric solutions of equations (1) - (5) in the sample problem cited above are shown in Table I below. The calculated values are underlined. For a 100 ton vessel and a total gas flow rate of 2,000 cfm, W = 100, $K_r$ = 1.0° F/min. and $F_T$ = 2,000 cfm.

TABLE I

| Blow Period | $T_i$ °F | $T_f$ °F | $C_i$ % | $C_f$ % | $F_{O_2}$ (cfm) | $F_{CO_2}$ (cfm) | $F_{Ar}$ (cfm) | X | t (min) |
|---|---|---|---|---|---|---|---|---|---|
| 1 | 2750 | 3050 | 1.0 | (0.39) | 1500 | 500 | — | 0.45 | (25) |
| 2 | 3050 | 3050 | 0.39 | 0.25 | (500) | (1500) | — | 0.55 | (6.5) |
| 3 | 3050 | 3100 | 0.25 | 0.05 | (390) | (610) | 1000 | 0.35 | (26.5) |

To illustrate the effectiveness of controlling melt temperature with the use of $CO_2$ in the blowing mixture, three heats of stainless steel were made in an AOD vessel in which $CO_2$ was blown as one of the process gases in accordance with equations (1), (2) and (3). The refining vessel had a factor $K_r$ = 4° F/min. The desired end point of the blow and the actual end point are compared in Table II. The very small differences between the actual and desired carbon content and final temperature are indicative of the effective temperature control which can be achieved by using $CO_2$ as a process gas in accordance with the invention.

TABLE II

| | Heat Sheet Data, Calculated Practices, and Results of Three Test Heats | | | | | | | | | | | |
|---|---|---|---|---|---|---|---|---|---|---|---|---|
| | | Starting Conditions | | | | Aim End-Point | | Calculated Values | | | Actual End-Point | |
| Run | $C_i$ | $T_i$ | $F_{Ar}$ | W | X | $C_f$ | $T_f$ | t | Avg.$F_{CO_2}$ | Avg.$F_{O_2}$ | $C_f$ | $T_f$ |
| A | 0.44 | 3110 | 215 | 19 | 0.50 | 0.10 | 3145 | 20 | 82 | 170 | 0.11 | 3133 |
| B | 0.08 | 3145 | 265 | 18 | 0.12 | 0.04 | 3175 | 14 | 53 | 115 | 0.038 | 3170 |
| C | 0.10 | 3075 | 275 | 17 | 0.20 | 0.05 | 3100 | 9.6 | 47 | 120 | 0.045 | 3100 |

[The most surprising effect of using $CO_2$ in the blowing gas mixture relates to carbon removal efficiency.] Generally, the lower carbon content of the melt, the lower the carbon removal efficiency. [Thus, an improvement in carbon removal efficiency is generally most desirable during the period when the steel is to be decarburized to a carbon level below that which is in equilibrium with CO at a partial pressure of one atmosphere; namely, during the third phase of decarburization.]

To illustrate the [improvement in] carbon removal efficiency at low carbon levels, 6 heats of stainless steel were made in an 18 ton AOD vessel — 4 heats being run as in conventional AOD practice with a 2 component (argon-oxygen) blowing mixture; the remaining 2 heats using a 3 component mixture including $CO_2$ in accordance with the present invention. The measured gas flow rates, initial and final carbon contents and bath temperatures, and the resulting carbon removal efficiency are indicated in Table III. The values for carbon removal efficiency (X) were calculated based upon the total oxygen introduced into the melt including that resulting from the decomposition of $CO_2$. That is, the total oxygen in the melt was assumed to be $F_{O_2} + \frac{1}{2} F_{CO_2}$, the combined flow being indicated in Table III as $F'_{O_2}$. [The improvement in carbon removal efficiency during the runs B and C wherein $CO_2$ was used in the blowing mixture is appreciable.]

TABLE III

| RUN | $F'_{O_2}$ | $F_{ar}$ | $CO_2$ | $T_f$ | $T_r$ | $C_f$ | $C_r$ | X |
|---|---|---|---|---|---|---|---|---|
| B | 113 cfm | 267 | Yes | 3145° F | 3175° F | 0.079% | 0.038% | 12.3% |
| C | 117 | 267 | Yes | 3075 | 3100 | 0.100 | 0.045 | 22.0 |
| D | 133 | 250 | No | 3150 | 3220 | 0.061 | 0.032 | 10.2 |
| E | 150 | 267 | No | 3200 | 3250 | 0.062 | 0.031 | 10.0 |
| F | 133 | 183 | No | 3135 | 3188 | 0.042 | 0.023 | 5.2 |
| G | 133 | 183 | No | 3115 | 3180 | 0.052 | 0.023 | 10.0 |

What is claimed is:

1. In a process for decarburizing a chromium-containing molten steel characterized by the subsurface injection of oxygen and at least one inert gas selected from the group consisting of helium, neon, krypton, argon, xenon and nitrogen, into a mass of said molten steel, wherein at least a portion of said oxygen reacts with the carbon in said molten steel to form a volatile carbon oxide, comprising a first phase of decarburization wherein the temperature of said molten steel is adjusted to the desired operating range; a second phase of decarburization wherein the carbon content of the molten steel is reduced to a predetermined value corresponding approximately to the carbon content of the melt in equilibrium with CO at a partial pressure of 1 atmosphere and at a temperature within said desired operating range; and a third phase of decarburization wherein the carbon content of the melt is reduced from said predetermined value to approximately the desired carbon content of the molten steel, the improvement comprising:

injecting a gas consisting essentially of $CO_2$ into the molten steel during said third phase of decarburization in an amount less than that defined by the formula:

$$F_{CO_2} = [F_I P/(1 - P - 2XF_{O_2}]$$

where:

$F_{CO_2}$ = flow rate of $CO_2$, (cfm)

$F_I$ = flow rate of said inert gas, (cfm)

P = equilibrium partial pressure of CO for the particular bath temperature and carbon content of the molten steel, (atmospheres), and X = carbon removal efficiency in the absence of $CO_2$.

2. The improvement as in claim 1 wherein the flow rate of $CO_2$ injected into the melt is defined approximately by the formulae:

$$t = \frac{322 \frac{C_i - C_f}{X} [0.40X + 1.29(1 - X) + 1.24] - T_f + T_i}{\frac{1.24(F_T - F_I) + Z_I F_I}{W} + Kr}$$

$$F_{co2} = 2(F_T - F_I) - \frac{644(C_i - C_f)W}{xt}$$

$$F_{O_2} = F_T - F_I - F_{CO_2}$$

where:

$F_{CO_2}$ = flow rate of $CO_2$, (cfm)

$F_{O_2}$ = flow rate of $O_2$, (cfm)

$F_I$ = flow rate of inert gas, (cfm)

$F_T$ = total gas flow rate for the particular system, (cfm)

t = blowing time, (minutes)

$C_i$ = carbon content of the melt at the start of the blow, (percent)

$C_f$ = carbon content of the melt at the end of the blow, (percent)

$T_i$ = metal bath temperature at the start of the blow, (° F)

$T_f$ = metal bath temperature at the end of the blow, (° F)

W = total weight of molten metal, (tons)

$K_r$ = measured heat loss coefficient of the vessel (° F/min)

X = carbon removal efficiency in the absence of $CO_2$, and $Z_I$ = enthalpy of the inert gas at the operating temperature of the bath.

3. The improvement as in claim 1 further including the step of injecting a gas consisting essentially of $CO_2$ into the molten steel during said second phase of decarburization approximately as defined by the formulae:

$$t = \frac{322 \frac{C_i - C_f}{X} [0.40X + 1.29(1 - X) + 1.24] - T_f + T_i}{\frac{1.24(F_T - F_I) + Z_I F_I}{W} + Kr}$$

$$F_{co2} = 2(F_T - F_I) - \frac{644(C_i - C_f)W}{Xt}$$

$$F_{O_2} = F_T - F_I - F_{CO_2}$$

where:

$F_{CO_2}$ = flow rate of $CO_2$, (cfm)

$F_{O_2}$ = flow rate of $O_2$, (cfm)

$F_I$ = flow rate of inert gas, (cfm)

$F_T$ = total gas flow for the particular system, (cfm)

t = blowing time, (minutes)

$C_i$ = carbon content of the melt at the start of the blow, (percent)

$C_f$ = carbon content of the melt at the end of the blow, (percent)

$T_i$ = metal bath temperature at the start of the blow, (° F)

$T_f$ = metal bath temperature at the end of the blow, (° F)

W = total weight of molten metal, (tons)

$K_r$ = measured heat loss coefficient of the vessel (° F/min)

X = carbon removal efficiency in the absence of $CO_2$, and $Z_I$ = enthalpy of the inert gas at the operating temperature of the bath.

4. The improvement as in claim 1 further including the step of injecting a gas consisting essentially of $CO_2$ into the molten steel during said first phase of decarburization for a period of time defined approximately by the formula:

$$t = W(T_f - T_i)/[0.40X + 1.35(1-X)][F_{O_2} + F_{CO_2}] - 0.62\,F_{CO_2} - KrW - Z_I F_I$$

where:

$F_{CO_2}$ = flow rate of $CO_2$, (cfm)

$F_{O_2}$ = flow rate of $O_2$, (cfm)

$F_I$ = flow rate of inert gas, (cfm)

t = blowing time, (minutes)

$T_i$ = metal bath temperature at the end of the blow, (° F)

W = total weight of molten metal, (tons)

$K_r$ = measured heat loss coefficient of the vessel (° F/min)

X = carbon removal efficiency in the absence of $CO_2$, and $Z_I$ = enthalpy of the inert gas at the operating temperature of the bath.

* * * * *

UNITED STATES PATENT OFFICE

CERTIFICATE OF CORRECTION

Patent No. RE 29,584 Dated March 21, 1978

Inventor(s) Heise, et al

It is certified that error appears in the above-identified patent and that said Letters Patent are hereby corrected as shown below:

In col. 4, line 14, equation (1) should read:

$$-- \; t = \frac{322 \, \frac{C_i - C_f}{X} \, [0.40 \, X + 1.29 \, (1-X) + 1.24] - T_f + T_i}{\frac{1.24 \, (F_T - F_I) + Z_I \, F_I}{W} + K_r} \; --$$

Cols. 7 and 8, line 21, the headings for Table III should read:

-- Run $F'_{O_2}$ $F_{Ar}$ $CO_2$ $T_i$ $T_F$ $C_i$ $C_F$ X --

UNITED STATES PATENT OFFICE

CERTIFICATE OF CORRECTION

Patent No. RE 29,584 Dated March 21, 1978

Inventor(s) Heise et al

It is certified that error appears in the above-identified patent and that said Letters Patent are hereby corrected as shown below:

In col. 8, line 61, should read:

-- $F_T$ = total gas flow rate for the particular system, (cfm) --

In col. 10, line 9, "end" should read -- start --.

In col. 10, between lines 10 and 11, insert

-- $T_F$ = metal bath temperature at the end of the blow, (°F). --

Signed and Sealed this

*Twenty-eighth* Day of *November 1978*

[SEAL]

*Attest:*

RUTH C. MASON
*Attesting Officer*

DONALD W. BANNER
*Commissioner of Patents and Trademarks*